United States Patent
Balentine et al.

(10) Patent No.: US 7,194,409 B2
(45) Date of Patent: Mar. 20, 2007

(54) METHOD AND SYSTEM FOR PREVENTING ERROR AMPLIFICATION IN NATURAL LANGUAGE DIALOGUES

(76) Inventors: Bruce Balentine, 517 Roberts St., Denton, TX (US) 76201; Rex Stringham, 985 El Capitan, Danville, CA (US) 94526; Ralph Melaragno, 441D Las Casitas, Santa Rosa, CA (US) 95403; Justin Munroe, 3400 Joyce La. #103, Denton, TX (US) 76207

( * ) Notice: Subject to any disclaimer, the term of this patent is extended or adjusted under 35 U.S.C. 154(b) by 0 days.

(21) Appl. No.: 10/433,021

(22) PCT Filed: Nov. 30, 2001

(86) PCT No.: PCT/US01/45090

§ 371 (c)(1),
(2), (4) Date: Oct. 14, 2003

(87) PCT Pub. No.: WO02/060162

PCT Pub. Date: Aug. 1, 2002

(65) Prior Publication Data

US 2004/0098253 A1   May 20, 2004

Related U.S. Application Data

(60) Provisional application No. 60/250,412, filed on Nov. 30, 2000.

(51) Int. Cl.
*H04M 3/493* (2006.01)
(52) U.S. Cl. .................................. 704/253; 379/88.03

(58) Field of Classification Search ................ 704/253, 704/233, 275; 379/88.01, 88.02, 88.03, 88.04
See application file for complete search history.

(56) References Cited

U.S. PATENT DOCUMENTS

| 5,737,724 | A  |   | 4/1998  | Atal et al. |
| 5,765,130 | A  |   | 6/1998  | Nguyen |
| 5,956,675 | A  | * | 9/1999  | Setlur et al. ................ 704/231 |
| 6,144,938 | A  |   | 11/2000 | Surface et al. |
| 6,449,496 | B1 | * | 9/2002  | Beith et al. ................. 455/563 |
| 6,697,782 | B1 | * | 2/2004  | Iso-Sipila et al. ........... 704/275 |
| 6,882,973 | B1 | * | 4/2005  | Pickering .................... 704/270 |

FOREIGN PATENT DOCUMENTS

| EP | 0736995 A | 10/1996 |
| EP | 0895224 A | 2/1999 |

* cited by examiner

*Primary Examiner*—Donald L. Storm
(74) *Attorney, Agent, or Firm*—Carr LLP

(57) ABSTRACT

A method and system for allowing a user to interface to an interactive voice response system via natural language commands. The system plays a prompt that initiates user interaction. In certain embodiments, the system detects initial user speech, wherein the initial user speech begins during the prompt or during a silence after the prompt. Then, the system determines whether the user speech restarts (second user speech) within a predetermined time period, wherein the predetermined time period is dependent upon whether the initial user speech began during the prompt or during the silence. If the user speech does restart, then the system uses the second user speech for recognition purposes. If the user speech does not restart, then the system uses the initial user speech for recognition purposes.

24 Claims, 5 Drawing Sheets

METHOD AND SYSTEM FOR PREVENTING ERROR AMPLIFICATION IN NATURAL LANGUAGE DIALOGUES

CLAIM OF PRIORITY

This application claims priority from U.S. Provisional Patent Application No. 60/250,412 entitled "SYSTEM FOR USER INTERFACE DESIGN" filed on behalf of Balentine, et al., on Nov. 30, 2000.

TECHNICAL FIELD

The invention relates generally to telecommunications systems and, more particularly, to providing a method and an apparatus providing a voice interface to an Interactive Voice Response system.

BACKGROUND

Interactive voice response systems (IVR), such as brokerage systems, flight information systems, accounting systems, and the like, generally allow users, i.e., callers, to access information by navigating a series of prompts and speaking voice commands. The voice commands generally comprise single commands, commonly referred to as single-token commands, and prevent the users from entering multi-token commands in a natural-language (NL) format.

NL applications are preferred because they more closely mimic a human-to-human interaction and allow more information to be conveyed in a shorter amount of time. For instance, a series of commands in a single-token application that retrieve a stock quote may entail the user speaking "quote" and the stock name/symbol at two separate prompts. In an NL application, however, a user may simply speak, "I would like a quote for Disney." The NL command generally conveys all information necessary to retrieve the request information in fewer prompt-command cycles than a single-token system.

Users, however, generally experience difficulty using NL applications. First, NL applications typically allow and accept single-token commands, which the user believes to be more reliable. Thereafter the users become accustomed to interacting in a single-token manner, losing the capability of employing full sentences containing multiple tokens. This phenomenon is commonly referred to as "convergence," in that the IVR system and the user converge on a limited way of interacting.

Another problem with interfacing with NL IVR systems is the ability to interrupt the prompt with a command, commonly referred to as barge-in. Barge-in is a natural behavior of a user interfacing with either another human or an IVR system, especially as the user becomes familiar with a particular IVR system. When barging-in, however, a user may typically have a false start or stutter before repeating the command. IVR systems generally respond by rejecting the command, which reinforces convergence to a single-token command discussed above.

Prior art attempts generally allowed single-token and NL commands in a single IVR system. This solution, however, fails to "train" the user in the more efficient method of using NL commands. As a result, the NL commands remain ineffective.

Therefore, what is needed is a method and a system for interfacing with an IVR system in an NL format.

SUMMARY

The present invention provides a method and an apparatus for providing an interface between a user and a machine through which the user is able to speak voice commands, preferably in a natural language format. In one embodiment, the method and apparatus provides a transition from one state to a default state upon a failure to confidently recognize a spoken command.

In another embodiment of the present invention, the method and apparatus provides a transition from one state to a previous state upon a failure to confidently recognize a spoken command.

In yet another embodiment of the present invention, the method and apparatus allows a tentative barge-in state and/or a tentative machine listening state to accommodate user speech patterns, such as false starts, stuttering, and the like, during barge-in.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a state transition diagram illustrating one embodiment of barge-in; and FIG. 5 is a state transition diagram illustrating another embodiment of barge-in.

DETAILED DESCRIPTION

The principles and advantages of the present invention are best understood by referring to the illustrated embodiment depicted in FIGS. 1–5.

Figure 1:
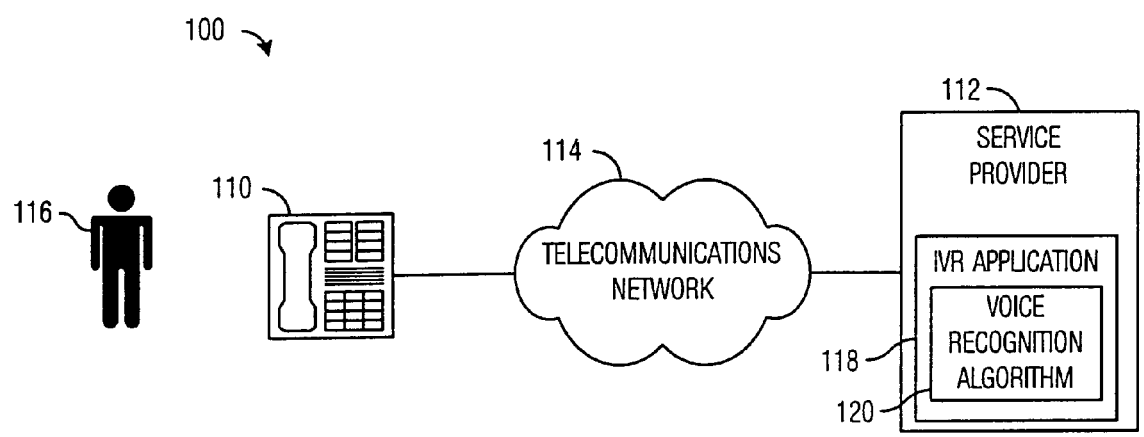
FIG. 1 schematically depicts a typical network environment that embodies the present invention.

Referring to FIG. 1 of the drawings, the reference numeral 100 generally designates an interactive voice response (IVR) system embodying features of the present invention in a telecommunications network environment. The IVR system 100 is exemplified herein as an application in a telecommunications environment that takes the form of call center automation, call routers, call directors, voice portals, voice web applications, telephone access to voicemail and email, automated personal assistants hosted by telephone service providers, and the like. It is understood that other types of environments and/or applications may constitute the IVR system 100 as well, and the IVR system 100 is not limited to being a telecommunications environment and may, for example, include environments such as voice recognition used in wireline/wireless telephones for voice-activated dialing, microphones attached to personal computers, voice portals, speech-enhanced services such as voice mail, personal assistant applications, and the like, speech interfaces with devices such as home appliances, communications devices, office equipment, vehicles, and the like, other applications/environments that utilize voice recognition as a means for commanding/controlling, and the like.

The IVR system 100 generally comprises a telephone 110 coupled to a service provider 112 via a telecommunications network 114, such as the Public Switched Telephone Network (PSTN). The service provider 112 is configured for providing the user 116 with services, such as stock quotes, customer services, account services, and the like, utilizing voice as a means of input.

The service provider 112 generally comprises an IVR application 118, which in turn utilizes a voice recognition algorithm 120 to analyze a spoken speech pattern and return a result to the IVR application 118. Voice recognition algorithms, such as template-based dynamic time warp (DTW), hidden Markov models (HMM), Viterbi search algorithms, and the like, generally compare a spoken speech pattern with the patterns of one or more model grammars, i.e., words or phrases. The result from the voice recognition algorithm 120 typically comprises a value that corresponds to a command and a confidence level. The confidence level is an indication of how close the spoken speech pattern matches a model speech pattern corresponding to the result.

In accordance with the present invention, a user 116 accesses the service provider 112 via the telephone 110 and the telecommunications network 114 for the purpose of receiving information and/or performing a function via one or more voice commands, i.e., spoken speech patterns. The IVR application 118 of the service provider 112 receives the voice commands and performs the voice recognition algorithm 120. The voice recognition algorithm 120 evaluates the speech patterns of the voice commands by comparing the speech patterns of the user 116 with the model speech patterns of a grammar, i.e., command words that are valid in any given state. The voice recognition algorithm 120 returns a result indicating the command that the voice recognition algorithm believes the user 116 has spoken and a confidence level. Given the result and the confidence level from the voice recognition algorithm 120, the IVR application 118 performs the requested function and/or functions, if appropriate, otherwise, the IVR application 118 utilizes internal algorithms to handle error conditions, such as no command recognized, low confidence, and the like.

Figure 2:
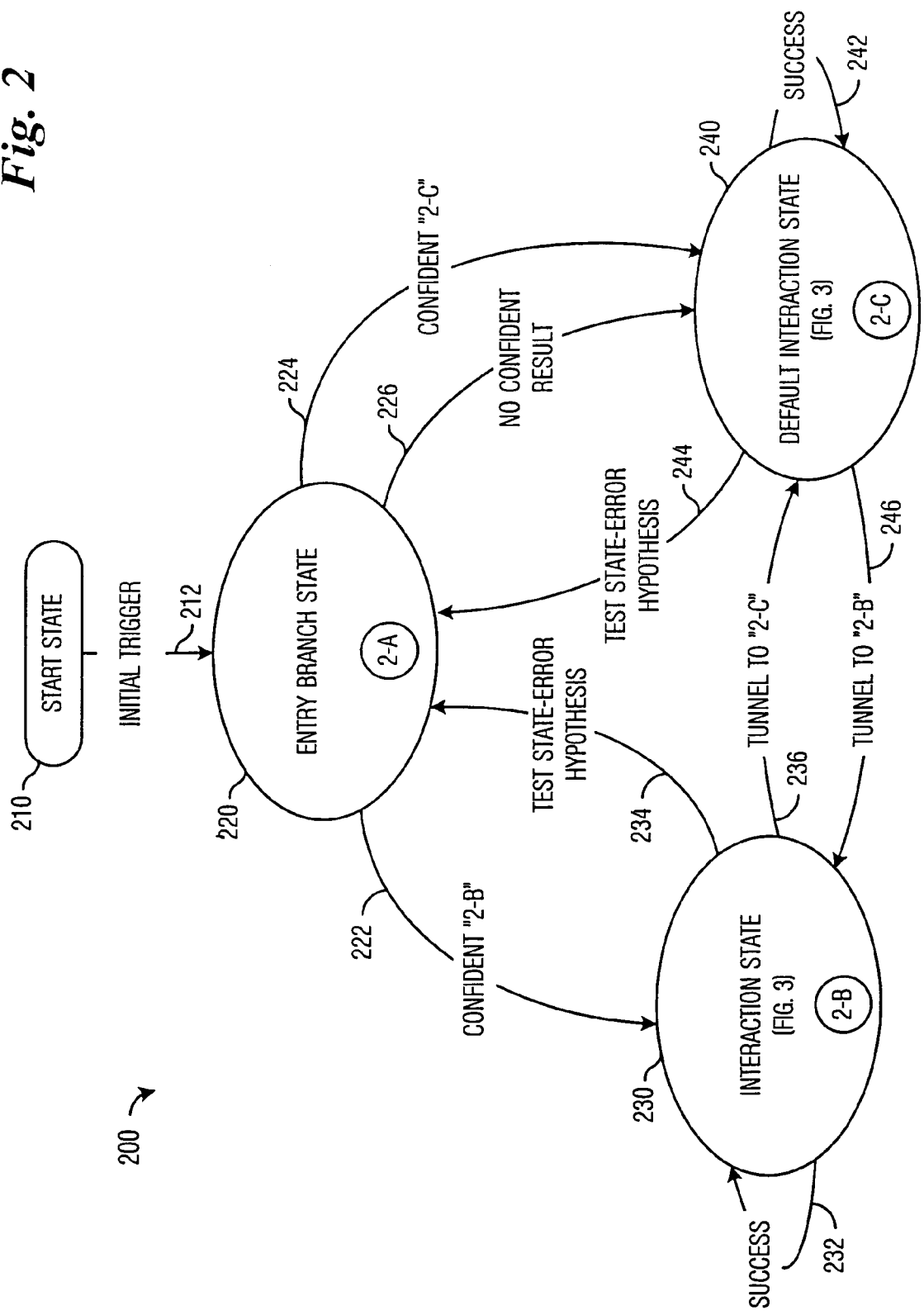
FIG. 2 is a top-level state transition diagram illustrating one embodiment in which a user interfaces with an IVR system with NL prompts.
Figure 3:
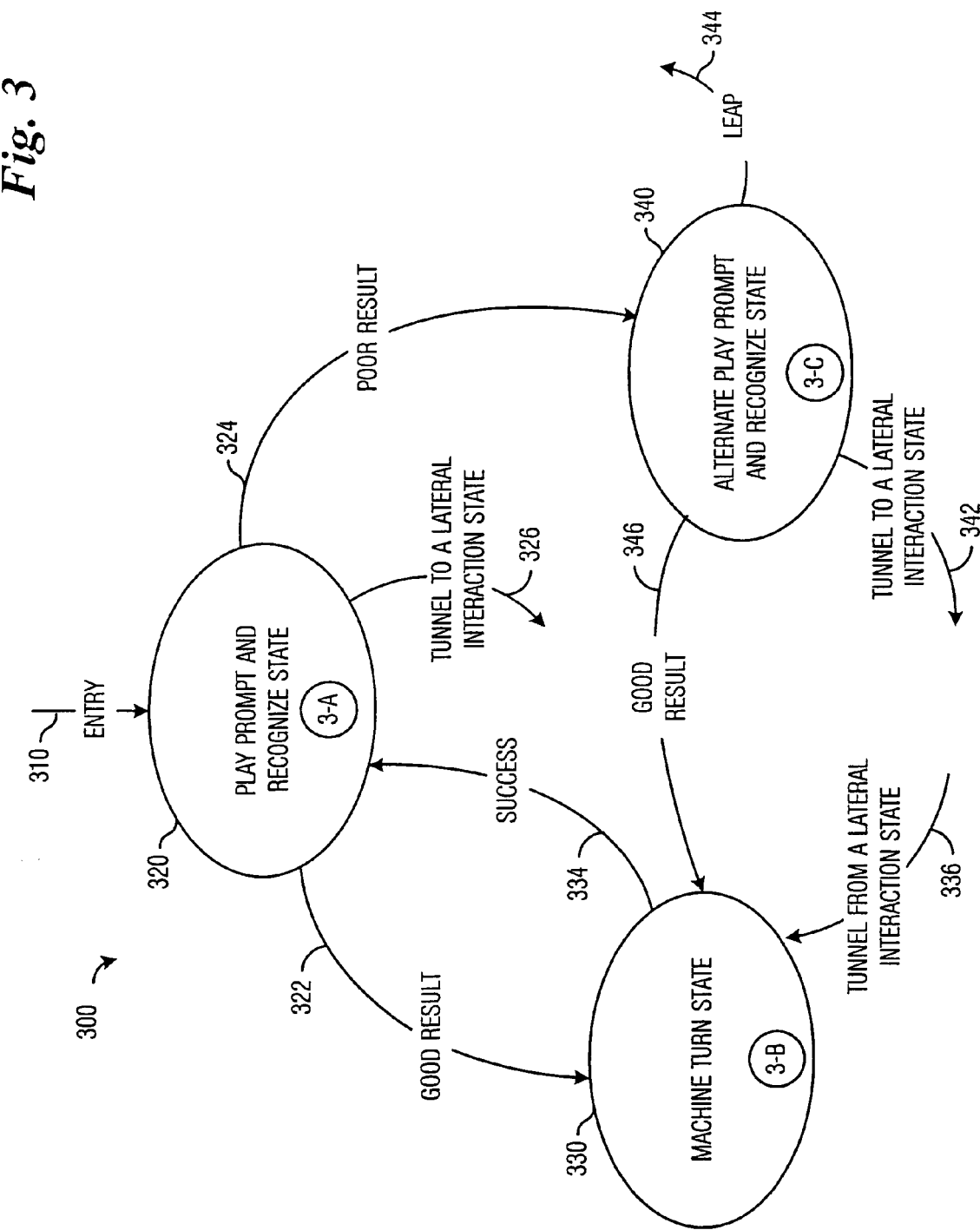
FIG. 3 is a state transition diagram illustrating one embodiment in which an interaction state is shown.

FIG. 2 is a state transition diagram that may be used by the IVR system 100 in accordance with one embodiment of the present invention to control the voice recognition of a verbal command. While the reference numeral 200 illustrates a top-level state transition diagram of the IVR system 100, it should be noted that the IVR system 100 generally comprises nested prompts, and as such, it will be appreciated by one skilled in the art that the top-level state transition diagram 200 may be duplicated within various levels of the IVR system 100. Additionally, in the discussion that follows, FIG. 2 represents a top-level state transition diagram and FIG. 3 represents a state transition diagram that may be used within one of the interaction states, such as the Interaction State 230 and/or the Default Interaction State 240 of FIG. 2.

Accordingly, in Start State 210 the IVR system 100 is awaiting an "initial trigger" event 212, such as the arrival of an incoming call, system activation, or other event indicating the start of a recognition session. Upon the arrival of the "initial trigger" event 212, the IVR system 100 transitions to an Entry Branch State 220, wherein preferably a greeting and/or welcoming message is played, a prompt is played that indicates to the user 116 the available alternatives, the user 116 speaks a voice command, and the voice recognition algorithm 120 executes and returns a command and a confidence level.

Preferably, the Entry Branch State 220 provides the user 116 with a prompt indicating a 2-way branch, such as "Would you like to get a stock quote or place a trade?" Limiting the number of possible branches reduces errors due to branching to the wrong state, commonly referred to as state errors. State errors typically cause errors to compound and users to become frustrated, both of which reduce the effectiveness of NL recognition systems. Empirical testing has shown, however, that 3-way branching states, such as "Would you like to get a stock quote, place a trade, or check account balances?", are also effective. The use of additional branching states is dependent upon, among other things, the voice recognition algorithm 120, the IVR application 118, the similarity of the grammar, and the like.

If, while in the Entry Branch State 220, the voice recognition algorithm 120 returns a confident result corresponding to "2-B", then the IVR system 100 transitions to an Interaction State 230, wherein the functions corresponding with a "2-B" command are performed, as illustrated by the "confident '2-B'" event 222.

If, in the Entry Branch State 220, however, the voice recognition algorithm 118 returns a confident result corresponding to "2-C" or a result indicating that the voice recognition algorithm 118 was unable to return a confident result, then the IVR system 100 transitions into a Default Interaction State 240, wherein the functions corresponding with the "2-C" command are performed, as illustrated by the "confident '2-C'" event 224 and the "no confident result" event 226, respectively. By transitioning from the Entry Branch State 220 to the Default Interaction State 240 as a default branch when the voice recognition algorithm 118 fails to return a confident result allows the IVR system 100 to automatically transition the user 116 into the state most likely requested by the user 116. For instance, a service provider 112 that provides a user 116 with an alternative between receiving a stock quote and entering a stock buy/sell order may find that most inquiries pertain to receiving a stock quote. In this circumstance the service provider 112 may automatically transition the user 116 from the Entry Branch State 220 to the Default Interaction State 240, i.e., receive a stock quote, if the voice recognition algorithm 118 fails to return a confident result. As a result, the user 116 will most likely perceive that the voice recognition algorithm correctly recognized the voice command of the user 116.

The Interaction State 230 and the Default Interaction State 240 represent states that perform functions for the user 116. As discussed above, these states may comprise additional prompts and state branches that are in themselves similar to FIG. 2. Further detail of the Interaction State 230 and the Default Interaction State 240 are discussed below with reference to FIG. 4.

The IVR system 100 remains in the Interaction State 230 while the voice recognition algorithm returns a successful response, as indicated by the "success" event 232. For example, the Interaction State 230 may correspond to the entering a stock buy/sell order of the example referred to above. In that state, a user 116 may enter buy/sell orders for several stocks, each one represented by the "success" event 232.

If, while in the Interaction State 230, the voice recognition algorithm returns a confident result corresponding to a "tunneling" phrase, such as "2-C," the IVR system 100 may transition to the state corresponding to the tunneling phrase, such as that indicated by the "tunnel to '2-C'" event 236 and the Default Interaction State 240. A "tunneling" phrase is a phrase that indicates the user desires to perform a transaction corresponding to a lateral state. Preferably, the grammar of any one state includes the grammar corresponding to that state, a tunneling grammar, and a global grammar for such items as "help," "cancel," and the like.

The tunneling grammar preferably comprises a subset of the grammar of the Entry Branch State 220 corresponding to the lateral state, and a subset of the grammar of the corresponding lateral state. For example, in the broker application discussed above where the Entry Branch State 220 represents a branch between the Interaction State 230 corresponding to stock trades and the Default Interaction State 240 corresponding to stock quotes, the grammar for the Entry Branch State 220 may comprise "quotes," "(stock) trade," "I'd like a quote," "I'd like (stock) trades," and "make a (stock) trade." Similarly, the grammar for the Default Interaction State 240 may comprise "<company>," "quote on<company>," "I'd like a quote on <company>," and "tell me about <company>." Therefore, a tunneling grammar for the Interaction State 230 may comprise a subset of the grammar of the Entry Branch State 220 corresponding to the lateral state (such as "I'd like a quote"), and a subset of the grammar of the corresponding lateral states (such as "I'd like a quote on<company>").

It should be noted, however, that the tunneling grammar for alternate states, such as an entry branch state or alternative interaction states, preferably comprises word models that are resistant to out-of-grammar errors. As a result, the likelihood of transitioning into a lateral state by error, thereby compounding state errors, is reduced.

Note that the grammar for the Default Interaction State 240 contains a phrase that is not contained in the tunneling phrase, such as "Tell me about <company>." Likewise, the grammar for the Entry Branch State 220 contains a phrase that is also not contained in the tunneling phrase, such as "quote." The tunneling grammar preferably represents the ideal phrases that demonstrate the user is or has become familiar with the IVR system 100. Additionally, constraining the tunneling grammar aids in the IVR system 100 performance and user acceptance by reducing the occurrence of false acceptance and substitution errors by reducing the size of the active grammar, and it rewards efficient user behavior and subtly punishes frivolous or superfluous speech.

If, while in the Interaction State 230, the voice recognition algorithm 120 fails to return a confident result for a predetermined number of attempts, preferably two consecutive attempts, the IVR system 100 preferably transitions to the Entry Branch State 220, as indicated by the "test state-error hypothesis" event 234. This transitions the user 116 to a known entry state in the event that the IVR system 100 cannot determine what command the user 116 has spoken. In such a situation, the voice recognition algorithm 120 has failed a plurality of attempts, such as two attempts illustrated in FIG. 2, to recognize the spoken command. As a result, the IVR application 118 assumes that a state error has occurred and that the user 116 desires to be in a different state. In order to test this hypothesis, the IVR application 118 transitions to a known state and presents the user 116 with options that may allow the user 116 to transition into the desired state. By doing so, the IVR system 100 avoids taking undesirable branches and compounding state errors.

The Default Interaction State 240 is similar in behavior to the Interaction State 230. Specifically, the IVR system 100 remains in the Default Interaction State while the voice recognition algorithm returns a valid response, as indicated by the "success" event 242, and tunnels the user 116 to the Interaction State 230 upon a confident voice recognition algorithm 120 result corresponding to the Interaction State 230, as indicated by the "tunnel to '2-B'" event 246. Additionally, the IVR system 100 leaps from the Default Interaction State 240 to the Entry Branch State 220 upon a "test state-error hypothesis" event 244, i.e., the voice recognition algorithm 120 failed to return a confident result for a predetermined number of attempts, preferably two consecutive attempts.

FIG. 3 is a state transition diagram that may be used by the IVR system 100 in accordance with one embodiment of the present invention to control an interaction state as discussed above with reference to the Interaction State 230 and the Default Interaction State 240 of FIG. 2. Specifically, the reference numeral 300 generally illustrates a high-level interaction state transition diagram that may be used in conjunction with or separately from the top-level state transition diagram illustrated in FIG. 2 to control an IVR application in an interaction state.

The interaction state transition diagram 300 begins with the occurrence of an "entry" event 310, such as a "confident '2-B'" event 222, a "confident '2-C'" event 224, a "no confident result" event 226, a "tunnel to '2-B'" event 246, a "tunnel to '2-C'" event 236, among others, of FIG. 2. Upon the "entry" event 310, the IVR system 100 enters a Play Prompt and Recognize State 320. In the Play Prompt and Recognize State 320 the IVR system 100 plays a prompt, preferably an NL prompt, indicating to the user 116 the available alternatives, waits for the user 116 to speak the chosen alternative, and attempts to recognize the chosen alternative of the user 116. An NL prompt is a machine prompt that suggests options indirectly to a user rather than explicitly offering choices that the user may speak. The NL prompt is preferably an example prompt that encourages multi-token speech, such as "You might say, for example, 'I'd like to fly from Dallas to Boston on November 15th.'"

If the voice recognition algorithm 120 returns a good result then the IVR system 100 transitions into a Machine Turn State 330, as illustrated by the "good result" event 322. A good result event preferably comprises a result that indicates that the user 116 spoke a command that the voice recognition algorithm 120 recognized with an acceptable confidence level and, optionally, that the user 116 spoke the command in an NL format, i.e., a multi-token sentence, instead of a single-token command. An NL format is a multi-token utterance that conforms to the grammatical structure suggested by the application through the use of NL prompts and instructions. A confident NL response from the voice recognition algorithm is preferable to a single-token response because it is less vulnerable to false acceptance of OOG user speech. An NL response therefore has less stringent confidence criteria than a single-token response. If the voice recognition algorithm 120 did not recognize with an acceptable confidence level, or, optionally, the user 116 speaks a single-token command that was unable to return a result with the more stringent confidence level required of single-token responses, then the result is preferably considered a poor result.

The IVR system 100 remains in the Machine Turn State 330 while the IVR system 100 processes and/or performs the user command, such as processing a buy/sell stock order. After the IVR system 100 completes processing of the user command, the IVR system 100 preferably transitions back to the Play Prompt and Recognize State 320, as indicated by the "success" event 334. The "success" event 334 corresponds to the "success" event 232 and/or of 242 of FIG. 2. Preferably, the prompts that are played in the Play Prompt and Recognize State 320 are success prompts, i.e., a shortened set of prompts that are not necessarily NL prompts. For example, upon returning to the Play Prompt and Recognize State 320 as a result of the "success" event 232, the prompts may be set to "What's next?", "What now?", "Anything else?", and the like. Alternatively, the same prompts or other, alternative NL prompts may be used including non-speech sounds, such as tones, beeps, and the like.

If, while in the Play Prompt and Recognize State 320, the voice recognition algorithm 120 returns a poor result as discussed above, the IVR system 100 preferably transitions to an Alternative Play Prompt and Recognize State 340 as illustrated by the "poor result" event 324, wherein the user 116 is prompted with an alternative prompt that indicates another valid response in the current interaction state. Each transition to the Alternative Play Prompt and Recognize State 340 represents an additional attempt given to the user 116. While FIG. 3 depicts the preferred embodiment that utilizes one additional attempt, i.e., two consecutive attempts, additional Alternative Play Prompt and Recognize States may be utilized. The alternative prompts serve to aid in the training of the user to speak correct NL commands by providing various NL phrases that the user may mimic to perform the desired function.

The following dialog is one example of a dialog between the IVR system 100 and the user 116, wherein the description in brackets relates to the figure and state of the IVR system 100. In the following example, parentheses ("( )") are used to indicate optional words and/or phrases, and angle brackets ("< >") indicate that the user 116 may insert one or more alternative phrases. Additionally, the following example is only one of many possible dialogs and applications of the present invention and is presented only to clarify the purpose and interaction of the states discussed above. As such, the following example should not limit the present invention in any manner.

IVR system 100: "Would you like to get a quote or make a trade?"
[Entry Branch State 220, FIG. 2.]
User: "I'd like to make a trade."
[Recognition Algorithm 120 returns a Confident "2-B" result ("Confident '2-B'" event 222) and the IVR system 100 transitions to the trade state, i.e., the Interaction State 230 (FIG. 2), and the Play Prompt and Recognize State 320 (FIG. 3).]
IVR system 100: "For Trades, you might say, for example, 'Buy 100 shares of Disney.'"
[IVR system 100 is in Play Prompt and Recognize State 320]
User: "Oh wait, can you first tell me what the current price of Microsoft is?"
[Recognition Algorithm 120 returns a Poor Result ("Poor Result" event 324) and the IVR system 100 transitions to the Alternative Play Prompt and Recognize State 340 (FIG. 3).]
IVR system 100: "You might also try, 'Sell 300 shares of Intel.'"
[Alternative Play Prompt and Recognize State 340.]
User: "No, I want the current price of Microsoft"
[Recognition Algorithm 120 returns a poor result causing a "test state-error hypothesis" event 344 to occur and the IVR system 100 transitions to the Entry Branch State 220 (FIG. 2).]
IVR system 100: "Would you like to get a quote, or make a trade?"
[Entry Branch State 220]
User: "Get a quote."
[State Error recovered—Recognition Algorithm 120 returns a Confident "2-C" result ("Confident '2-C'" event 224) and the IVR system 100 transitions to the quote state, i.e., the Default Interaction State 240 (FIG. 2).]

IVR system 100: "For quotes, you might say, for example . . . "

If, in the Play Prompt and Recognize State 320 or the Alternative Play Prompt and Recognize State 340, the voice recognition algorithm 120 returns a result corresponding to an alternative, lateral state grammar, then the IVR system 100 preferably tunnels, i.e., transitions, the user 116 to the Machine Turn State 330 of the corresponding interaction state, as indicated by the "tunnel to a lateral interaction state" event 326, "tunnel to a lateral interaction state" event 342, and the "tunnel from a lateral interaction state" event 336 of FIG. 3, and the "tunnel to '2-C'" event 236 and the "tunnel to '2-B'" event 246 of FIG. 2. To clarify in reference to FIGS. 2 and 3, if the IVR system 100 is in the Interaction State 230 of FIG. 2 and the Alternative Play Prompt and Recognize State 340 of FIG. 3, and the voice recognition algorithm 120 returns a result corresponding to the Default Interaction State 240 of FIG. 2, then the IVR system 100 transitions from the Alternative Play Prompt and Recognize Prompt State 340 within the Interaction State 230 as indicated by the "tunnel to a lateral interaction state" event 342 and the "tunnel to '2-C'" event 236 and into the Machine Turn State 330 within the Default Interaction State 240 as indicated by the "tunnel from a lateral interaction state" event 336 and the "tunnel to '2-C'" event 236. Similarly, if the IVR system 100 is in the Interaction State 230 of FIG. 2 and the Play Prompt and Recognize State 320 of FIG. 3, and the voice recognition algorithm 120 returns a result corresponding to the Default Interaction State 240 of FIG. 2, then the IVR system 100 transitions from the Play Prompt and Recognize Prompt State 320 within the Interaction State 230 as indicated by the "tunnel to a lateral interaction state" event 326 and the "tunnel to '2-C'" event 236 and into the Machine Turn State 330 within the Default Interaction State 240 as indicated by the "tunnel from a lateral interaction state" event 336 and the "tunnel to '2-C'" event 236.

If, in the Alternative Play Prompt and Recognize State 340, the voice recognition algorithm 120 fails to return a good result, then the IVR system 100 preferably transitions back to a known state, as illustrated by the "test state-error hypothesis" event 344, which corresponds to the "test state-error hypothesis" event 234 and/or 244 of FIG. 2.

Furthermore, if while in the "Alternative Play Prompt and Recognize State" 340 the voice recognition algorithm 120 returns a good result, then the IVR application 118 preferably transitions into the "Machine Turn State" 330, which processes the user command.

Figure 4:
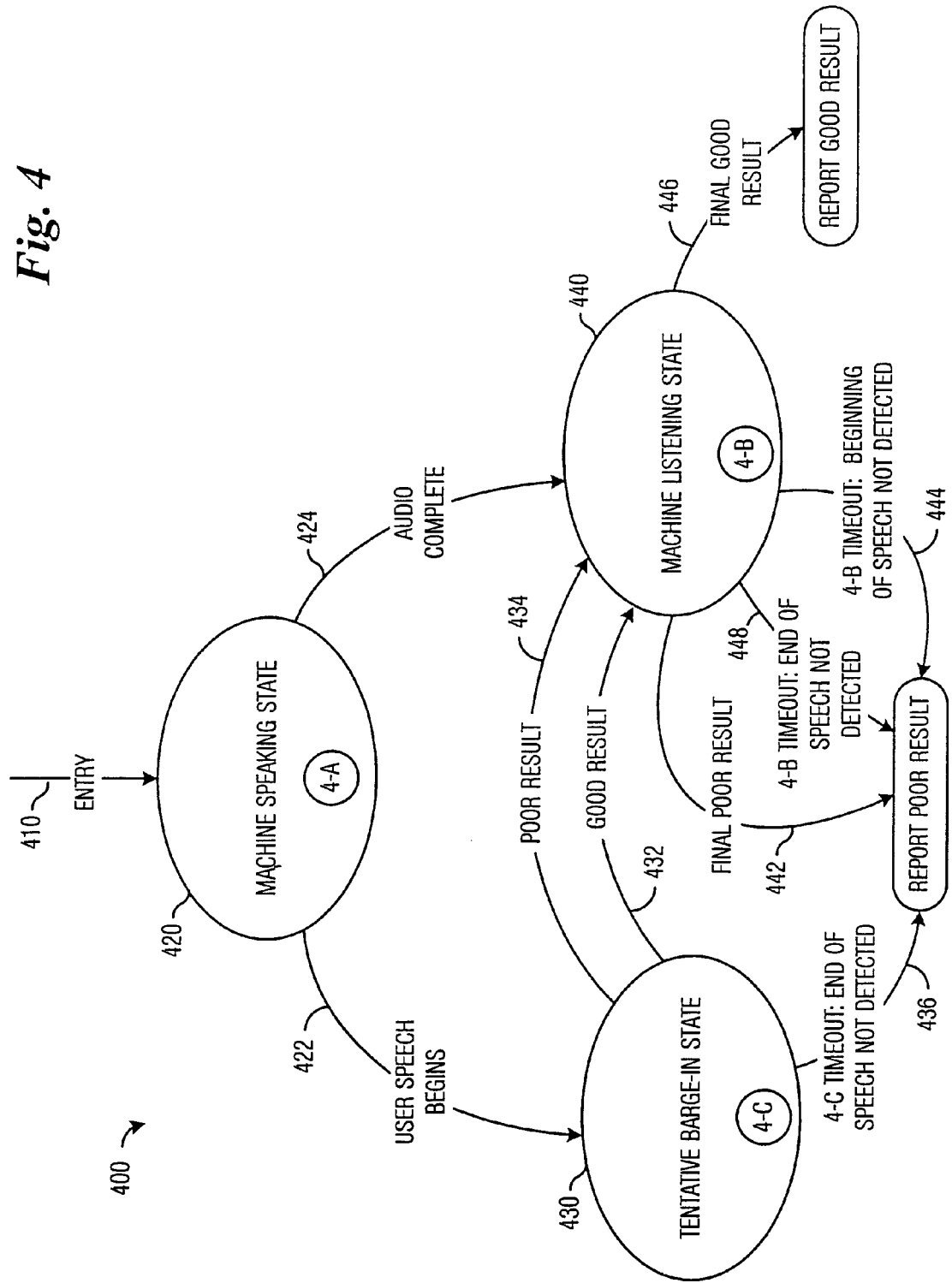

FIG. 4 is a state transition diagram that may be used by the IVR system 100 in accordance with one embodiment of the present invention to control prompt playing and recognition states. Specifically, the reference numeral 400 generally illustrates a barge-in state transition diagram that may be used in prompt playing and recognition states such as the Play Prompt and Recognize State 320 and the Alternative Play Prompt and Recognize State 340 of FIG. 3. Accordingly, the "entry" event 410 represents a transition into a prompt playing and recognition state.

Upon entry to the Machine Speaking State 420, a prompt is started. The prompt preferably continues to play until either the user 116 begins speaking, as illustrated by the "user speech begins" event 422, or the prompt is completed, as indicated by the "audio complete" event 424. If the "user speech begins" event 422 occurs while in the Machine Speaking State 420, then the IVR system 100 preferably transitions into the Tentative Barge-In State 430, wherein the prompt is terminated and the Voice Recognition Algorithm 120 listens for the end of user speech.

The Voice Recognition Algorithm 120 continues to listen for the end of user speech until the user speech discontinues and a good recognition result is returned, as indicated by the "good result" event 432, the user speech discontinues and a poor recognition result is returned, as indicated by the "poor result" event 434, or the user 116 speaks for longer than a predetermined amount of time, as indicated by the "timeout: end of speech not detected" event 436. Preferably, the predetermined amount of time the user is allowed to speak is based on the longest model of the grammar at any one prompt adjusted to account for normal speech patterns, such as pauses, hesitations, stuttering, and the like. For example, if the longest model of the grammar at a particular point is 3 seconds in length, the user may be allowed to speak for 3–5 seconds before triggering a timeout event. In determining the amount of time, however, it should be noted that time periods of less than 300 ms is generally considered to be speech at the syllabic level and to be too short. Longer periods, such as 600–800 ms is generally long enough for a single-token command phrase, but preferably 3 seconds for NL commands.

If, while in the Tentative Barge-In State 430, the voice recognition algorithm 120 returns a result, either good or poor, then the IVR system 100 preferably transitions into the Machine Listening State 440, as illustrated by the "good result" event 432 and the "poor result" event 434, respectively. In the Machine Listening State 440 the IVR system 100 listens for user speech. Preferably, if the Machine Listening State 440 is entered as a result of the "good result" event 432 the period of time the IVR system 100 waits for user speech is shorter, such as 1.5–4.0 seconds, but preferably 2.0 seconds, than the period of time the IVR system 100 waits in the Machine Listening State 440 as a result of the "poor result" event 434, such as 3.0–6.0 seconds, but preferably 4.0 seconds. By listening in the Machine Listening State 440 even on a "good result" event 432, the IVR system 100 compensates for false positive recognition results, false starts, partial inputs, and stuttering.

If, while in the Machine Listening State 440, additional user speech is detected and the Machine Listening State 440 was entered as a result of the "good result" event 432, then the IVR application 118 determines which result is to be used and reports a good result on the "final good result" event 446 transition. Preferably, the IVR application 118 determines which result, i.e., the result of the recognition of the first user speech from the "Tentative Barge-In State" 430 or the result of the recognition of the second user speech from the "Machine Listening State" 440, based on whether the speech patterns were multitoken/single-token speech patterns, and on which result had the higher confidence value. In the preferred embodiment, the result having the highest confidence value is reported as the good result. If the confidence values are substantially equivalent, then it is preferred that the multi-token result is used.

If the Machine Listening State 440 was entered as a result of the "good result" event 432 and no additional user input is detected as discussed above, then preferably a good result is reported as illustrated by the "final good result" event 446. Similarly, if the Machine Listening State 440 was entered as a result of the "poor result" event 434 and no additional user input is detected as discussed above, then preferably a poor result is reported as illustrated by the "final poor result" event 442.

If, while in the Tentative Barge-In State 430, the user speech continues for greater than a predetermined amount of time as discussed above, then the IVR system 100 times out as illustrated by the "4-C timeout: end of speech not detected" event 436. Preferably, if the IVR system 100 times out, then a poor result is indicated and the IVR application 118 proceeds accordingly.

If, while in the Machine Speaking State 420, the prompt completes as indicated by the "audio complete" event 424, then the IVR system 100 transitions into the Machine Listening State 440, wherein the IVR system 100 waits, preferably for up to 3–5 seconds, but for a duration that depends more precisely on the length of utterances in the grammar and the specifics of the prompt and the past conditions of the interaction, for the user to begin speaking. If the Voice Recognition Algorithm 120 detects a beginning and an end to the user speech, the voice recognition algorithm 120 processes the speech and a good result or a bad result is indicated accordingly, as illustrated by the "final good result" event 446 and the "final poor result" event 442.

If the IVR system 100 transitions into the Machine Listening State 440 as a result of the "audio complete" event 424, then there are two timeout conditions. First, if the user begins speaking and an end of the speech is not detected within a predetermined amount of time, such as five seconds, then the IVR system 100 preferably indicates a poor result as illustrated by the "4-B timeout: end of speech not detected" event 448. Second, if the Voice Recognition Algorithm 120 fails to detect a beginning of speech within a predetermined amount of time, such as four seconds, then the IVR system 100 preferably indicates a poor result as illustrated by the "4-B timeout: beginning of speech not detected" event 444.

Figure 5:
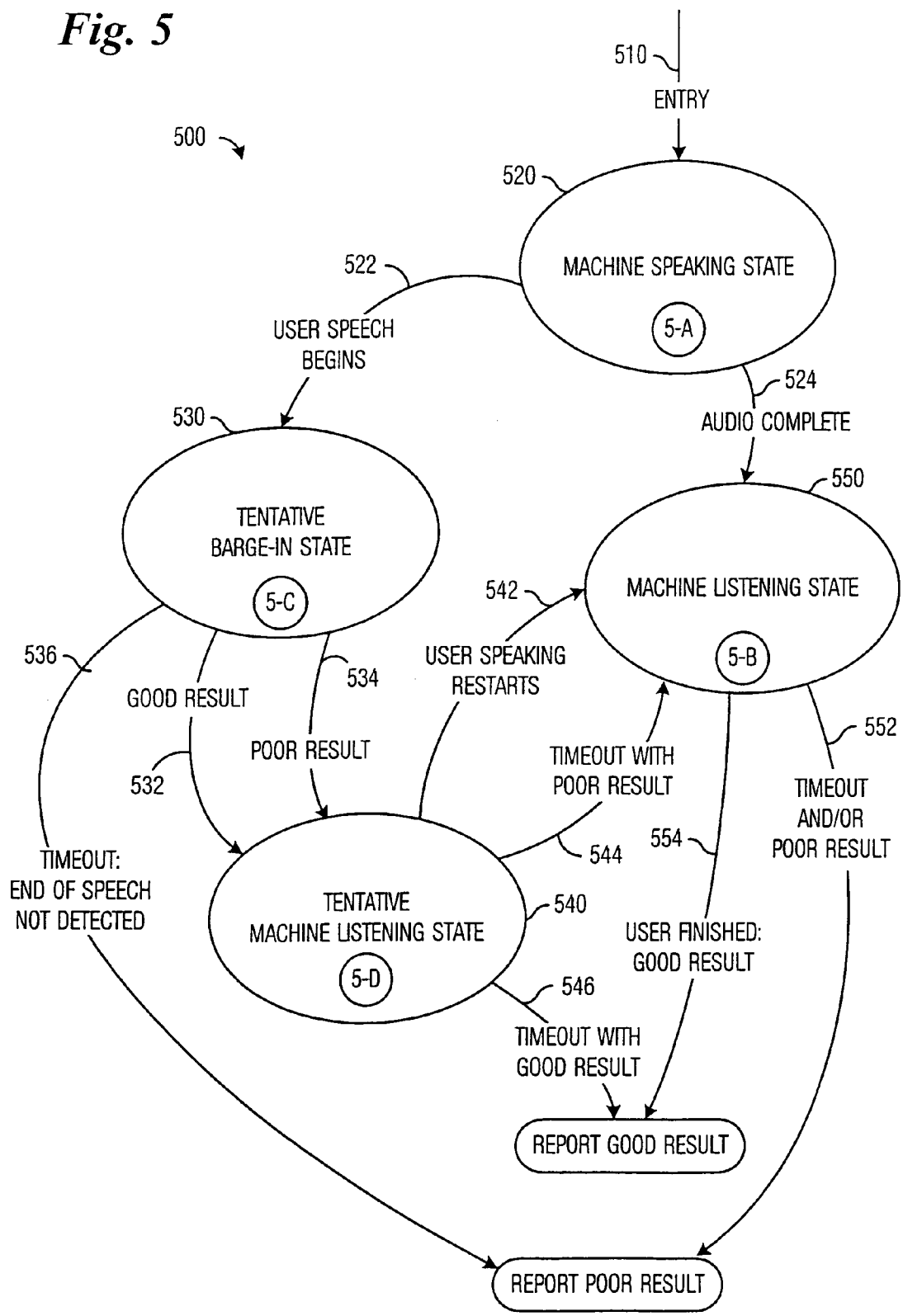

FIG. 5 is an alternative state transition diagram to FIG. 4 that may be used by the IVR system 100 in accordance with one embodiment of the present invention to control prompt playing and recognition states. Specifically, the reference numeral 500 generally illustrates a complex barge-in state transition diagram that may be used in prompt playing and recognition states such as the Play Prompt and Recognize State 320 and the Alternative Play Prompt and Recognize State 340 of FIG. 3. While FIGS. 4 and 5 generally represent alternative methods for controlling user barge-in, both systems could be used within a single IVR application. The barge-in state transition diagram 400 is preferred for applications with shorter prompts, that can exercise good control over prompt duration, and which are being used in environments that have little intermittent background noise. The complex barge-in state transition diagram 500, however, is preferred for situations which generally experience more frequent false starts, embedded pauses, and the like, such as applications with longer prompts or in which the application can exercise little control over prompt duration, and which are being used in environments that have unpredictable background noise.

Accordingly, the "entry" event 510 represents a transition into a prompt playing and recognition state. Upon entry to the Machine Speaking State 520, a prompt is started. The prompt preferably continues to play until either the user 116 begins speaking, as illustrated by the "user speech begins" event 522, or the prompt is completed, as indicated by the "audio complete" event 524. If the "user speech begins" event 522 occurs while in the Machine Speaking State 520, then the IVR system 100 preferably transitions into the Tentative Barge-In State 530, wherein the prompt is terminated and the Voice Recognition Algorithm 120 listens for the end of user speech.

The IVR system 100 continues to listen for the end of user speech until the user speech discontinues and a good recognition result is returned, as indicated by the "good result" event 532, the user speech discontinues and a poor recognition result is returned, as indicated by the "poor result" event 534, or the user 116 speaks for longer than a predetermined amount of time, such as 4–8 seconds, but preferably 6 seconds, as indicated by the "timeout: end of speech not detected" event 536.

If, while in the Tentative Barge-In State 530, the voice recognition algorithm 120 returns a result, either good or poor, then the IVR system 100 preferably transitions into the Tentative Machine Listening State 540, as illustrated by the "good result" event 532 and the "poor result" event 534, respectively. In the Tentative Machine Listening State 540 the IVR system 100 listens for user speech. If the user begins to speak within a predetermined amount of time, such as 2–5 seconds, but preferably 3 seconds, then the IVR system 100 transitions into a Machine Listening State 550, wherein the Voice Recognition Algorithm 120 captures the user's speech to attempt recognition.

If the user 116 does not begin speaking within a predetermined amount of time, however, then the IVR system 100 preferably transitions to report a good result if the IVR system transitioned into the Tentative Machine Listening State 540 as a result of the "good result" event 532, as illustrated by the "timeout with good result" event 546, and to the Machine Listening State 550 if the IVR system transitioned into the Tentative Machine Listening State 540 as a result of the "poor result" event 534, as illustrated by the "timeout with poor result" event 544. Therefore, if the voice recognition algorithm 120 confidently recognizes the user's initial attempt at barge-in in the Tentative Barge-In State 530, the IVR system 100 waits in the Tentative Machine Listening State 540 providing the user 116 an opportunity to re-enter the command to compensate for partial inputs, and the like. False positive recognition as a result of false starts, stuttering, background noise, and the like, cannot be known to the user at this point, but may still be corrected in the Tentative Machine Listening State 540 accidentally by users who respond to the pause as a cue that it is their turn to speak.

If the user does not reenter the command, then the IVR system 100 reports a good result 546. If, however, the voice recognition algorithm 120 fails to confidently recognize the user's initial attempt at barge-in, i.e., the "poor result" event 534, the IVR system 100 gives the user a second chance to enter a valid command by transitioning from the Tentative Machine Listening State 540 to the Machine Listening State 550. This new speech may correct for the poor result 534 if it was caused by a false start, partial input, certain instances of background noise, and stuttering, and the like.

If, while in the Tentative Machine Listening State 540, the user restarts speaking or the predetermined amount of time passes without a good recognition result, then the IVR system preferably transitions into the Machine Listening State 550, as illustrated by the "user speaking restarts" event 542 and the "timeout with poor result" event 544, respectively. Additionally, the IVR system 100 preferably transitions into the Machine Listening State 550 from the Machine Speaking State 520 if the prompt is completed, as illustrated by the "audio complete" event 524. The Machine Listening State 550 listens for the user 116 to speak and, if the user 116 speaks, attempts to recognize the speech pattern. If, while the IVR system 100 is in the Machine Listening State 550, the user 116 speaks and the speech pattern was recognized as a confident result, then the IVR system 100 preferably reports a good result as illustrated by the "user finished: good result" event 554.

If, however, while the IVR system 100 is in the Machine Listening State 550, the user 116 speaks and the voice recognition algorithm 120 returned a poor result, or the user 0.116 fails to speak for a predetermined amount of time, such as 3–7 seconds, but preferably 5 seconds, then the Machine Listening State 550 preferably returns a poor result, as illustrated by the "timeout and/or poor result" event 552.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

We claim:

1. A method of allowing a user to barge-in over prompts, the method comprising the steps performed by a machine of:
    playing a prompt;
    detecting an initial user speech from the user, wherein the initial user speech begins during the prompt or during a silence after the prompt;
    determining whether a second user speech starts within a predetermined amount of time, wherein a first predetermined amount of time corresponds to initial user speech during the prompt and a second predetermined amount of time corresponds to initial user speech during the silence;
    upon a determination that the second user speech starts, using the second user speech for recognition purposes; and
    upon a determination that the second user speech does not start, using the initial user speech for recognition purposes.

2. A method of allowing a user to barge-in over prompts, the method comprising the steps performed by a machine of:
    playing a prompt;
    determining whether the user has begun speaking, resulting in an initial user speech, wherein the initial user speech begins during the prompt or during a silence after the prompt;
    upon a determination that the user has begun speaking, generating a first recognition result based upon the initial user speech;
    determining whether the user speech restarts within a predetermined amount of time, resulting in a second user speech, wherein a first predetermined amount of time corresponds to initial user speech during the prompt and a second predetermined amount of time corresponds to initial user speech during the silence;
    upon a determination that the user speech restarts, performing the substeps of:
        generating a second recognition result based upon the second user speech; and
        reporting the second recognition result; and
    upon a determination that the user speech does not restart, reporting the first recognition result.

3. The method of claim 2, wherein the predetermined amount of time is between one and four seconds.

4. A method of allowing a user to barge-in over prompts, the method comprising the steps performed by a machine of:

playing a prompt;

determining whether the user has begun speaking, resulting in an initial user speech, wherein the initial user speech begins during the prompt or during a silence after the prompt;

upon a determination that the user has begun speaking, performing the substeps of:
  halting the playing of the prompt; and
  generating a first recognition result based upon the initial user speech;

determining whether the user speech restarts within a predetermined amount of time, resulting in a second user speech, wherein a first predetermined amount of time corresponds to initial user speech during the prompt and a second predetermined amount of time corresponds to initial user speech during the silence;

upon a determination that the user speech restarts, performing the substeps of:
  generating a second recognition result based upon the second user speech;
  determining whether the first recognition result or the second recognition result is to be used;
  upon a determination that the first recognition result is to be used, reporting the first recognition result; and
  upon a determination that the second recognition result is to be used, reporting the second recognition result; and upon a determination that the user speech does not restart, using the first recognition result.

5. The method of claim 4, wherein the predetermined amount of time is between one and four seconds.

6. The method of claim 4, wherein each of the first recognition result based at least partly upon the initial user speech and the second recognition result based at least partly upon the second user speech comprises a confidence value, and wherein the step of determining whether the first recognition result or the second recognition result is to be used is performed by selecting the result with the best confidence value.

7. The method of claim 4, wherein the step of determining whether the first recognition result based at least partly upon the initial user speech or the second recognition result based at least partly upon the second user speech is to be used is performed by selecting the result comprising a multi-token result.

8. An apparatus for allowing a user to barge-in over prompts, the apparatus comprising:

means for playing a prompt;

means for detecting an initial user speech from the user, wherein the initial user speech begins during the prompt or during a silence after the prompt;

means for determining whether a second user speech starts within a predetermined amount of time, wherein a first predetermined amount of time corresponds to initial user speech during the prompt and a second predetermined amount of time corresponds to initial user speech during the silence;

means for, upon a determination that the second user speech starts, using the second user speech for recognition purposes; and means for, upon a determination that the second user speech does not start, using the initial user speech for recognition purposes.

9. An apparatus for allowing a user to barge-in over prompts, the apparatus comprising:

means for playing a prompt;

means for determining whether the user has begun speaking, resulting in an initial user speech, wherein the initial user speech begins during the prompt or during a silence after the prompt;

means for, upon a determination that the user has begun speaking, generating a first recognition result based upon the initial user speech;

means for determining whether the user speech restarts within a predetermined amount of time, resulting in a second user speech, wherein a first predetermined amount of time corresponds to initial user speech during the prompt and a second predetermined amount of time corresponds to initial user speech during the silence;

means for, upon a determination that the user speech restarts, generating a second recognition result based upon the second user speech, and reporting the second recognition result; and means for, upon a determination that the user speech does not restart, reporting the first recognition result.

10. The apparatus of claim 9, wherein the predetermined amount of time is between one and four seconds.

11. An apparatus for allowing a user to barge-in over prompts, the apparatus comprising:

means for playing a prompt;

means for determining whether the user has begun speaking, resulting in an initial user speech, wherein the initial user speech begins during the prompt or during a silence after the prompt;

means for, upon a determination that the user has begun speaking, halting the playing of the prompt, and generating a first recognition result based upon the initial user speech;

means for determining whether the user speech restarts within a predetermined amount of time, resulting in a second user speech, wherein a first predetermined amount of time corresponds to initial user speech during the prompt and a second predetermined amount of time corresponds to initial user speech during the silence;

means for, upon a determination that the user speech restarts, generating a second recognition result based upon the second user speech, determining whether the first recognition result or the second recognition result is to be used, reporting the first recognition result upon a determination that the first recognition result is to be used, and reporting the second recognition result upon a determination that the second recognition result is to be used; and means for, upon a determination that the user speech does not restart, using the first recognition result.

12. The apparatus of claim 11, wherein the predetermined amount of time is between one and four seconds.

13. The apparatus of claim 11, wherein each of the first recognition result based at least partly upon the initial user speech and the second recognition result based at least partly upon the second user speech comprises a confidence value, and wherein the means for determining whether the first recognition result or the second recognition result is to be used is performed by selecting the result with the best confidence value.

14. The apparatus of claim 11, wherein the means for determining whether the first recognition result based at least partly upon the initial user speech or the second recognition result based at least partly upon the second user speech is to be used is performed by selecting the result comprising a multi-token result.

15. A computer program product for allowing a user to barge-in over prompts, the computer program product having a computer-readable medium with a computer-executable program embodied thereon, the computer-executable program comprising:
computer program code for playing a prompt;
computer program code for detecting an initial user speech from the user, wherein the initial user speech begins during the prompt or during a silence after the prompt;
computer program code for determining whether a second user speech starts within a predetermined amount of time, wherein a first predetermined amount of time corresponds to initial user speech during the prompt and a second predetermined amount of time corresponds to initial user speech during the silence;
computer program code for, upon a determination that the second user speech starts, using the second user speech for recognition purposes; and
computer program code for, upon a determination that the second user speech does not start, using the initial user speech for recognition purposes.

16. A computer program product for allowing a user to barge-in over prompts, the computer program product having a computer-readable medium with a computer-executable program embodied thereon, the computer-executable program comprising:
computer program code for playing a prompt;
computer program code for determining whether the user has begun speaking, resulting in an initial user speech, wherein the initial user speech begins during the prompt or during a silence after the prompt;
computer program code for, upon a determination that the user has begun speaking, generating a first recognition result based upon the initial user speech;
computer program code for determining whether the user speech restarts within a predetermined amount of time, resulting in a second user speech, wherein a first predetermined amount of time corresponds to initial user speech during the prompt and a second predetermined amount of time corresponds to initial user speech during the silence;
computer program code for, upon a determination that the user speech restarts, generating a second recognition result based upon the second user speech, and reporting the second recognition result; and
computer program code for, upon a determination that the user speech does not restart, reporting the first recognition result.

17. The computer program product of claim 16, wherein the predetermined amount of time is between one and four seconds.

18. A computer program product for allowing a user to barge-in over prompts, the computer program product having a computer-readable medium with a computer-executable program embodied thereon, the computer-executable program comprising:
computer program code for playing a prompt;
computer program code for determining whether the user has begun speaking, resulting in an initial user speech, wherein the initial user speech begins during the prompt or during a silence after the prompt;
computer program code for, upon a determination that the user has begun speaking, halting the playing of the prompt, and generating a first recognition result based upon the initial user speech;
computer program code for determining whether the user speech restarts within a predetermined amount of time, resulting in a second user speech, wherein a first predetermined amount of time corresponds to initial user speech during the prompt and a second predetermined amount of time corresponds to initial user speech during the silence;
computer program code for, upon a determination that the user speech restarts, generating a second recognition result based upon the second user speech, determining whether the first recognition result or the second recognition result is to be used, reporting the first recognition result upon a determination that the first recognition result is to be used, and reporting the second recognition result upon a determination that the second recognition result is to be used; and
computer program code for, upon a determination that the user speech does not restart, using the first recognition result.

19. The computer program product of claim 18, wherein the predetermined amount of time is between one and four seconds.

20. The computer program product of claim 18, wherein each of the first recognition result and the second recognition result comprises a confidence value, and wherein the computer program code for determining whether the first recognition result or the second recognition result is to be used is performed by selecting the result with the best confidence value.

21. The computer program product of claim 18, wherein the computer program code for determining whether the first recognition result or the second recognition result is to be used is performed by selecting the result comprising a multi-token result.

22. A method of allowing a user to barge-in over prompts, the method comprising the steps performed by a machine of:
playing a prompt;
detecting an initial user speech from the user, wherein the initial user speech begins during the prompt or during a silence after the prompt;
determining whether the user speech restarts within a predetermined amount of time, wherein the predetermined amount of time is varied at least partly in dependence upon a confidence level assigned to the initial user speech and wherein the confidence level is dependent upon whether the initial user speech begins during the prompt or during the silence;
upon a determination that the user speech restarts, using the user speech after the restart for recognition purposes; and
upon a determination that the user speech does not restart, using the initial user speech.

23. An apparatus for allowing a user to barge-in over prompts, the apparatus comprising:
means for playing a prompt;
means for detecting an initial user speech from the user, wherein the initial user speech begins during the prompt or during a silence after the prompt;
means for determining whether the user speech restarts within a predetermined amount of time, wherein the predetermined amount of time is varied at least partly in dependence upon a confidence level assigned to the initial user speech and wherein the confidence level is dependent upon whether the initial user speech begins during the prompt or during the silence;

means for, upon a determination that the user speech restarts, using the user speech after the restart for recognition purposes; and means for, upon a determination that the user speech does not restart, using the initial user speech.

24. A computer program product for allowing a user to barge-in over prompts, the computer program product having a computer-readable medium with a computer-executable program embodied thereon, the computer-executable program comprising:

computer program code for playing a prompt;

computer program code for detecting an initial user speech from the user, wherein the initial user speech begins during the prompt or during a silence after the prompt;

computer program code for determining whether the user speech restarts within a predetermined amount of time, wherein the predetermined amount of time is varied at least partly in dependence upon a confidence level assigned to the initial user speech and wherein the confidence level is dependent upon whether the initial user speech begins during the prompt or during the silence;

computer program code for, upon a determination that the user speech restarts, using the user speech after the restart for recognition purposes; and computer program code for, upon a determination that the user speech does not restart, using the initial user speech.

* * * * *